(No Model.)

G. F. HUTCHINS.
SHEDDING MECHANISM FOR LOOMS.

No. 596,879. Patented Jan. 4, 1898.

Witnesses
A. C. Whiting
M. J. Galvin

Inventor
George F. Hutchins
By his Attorney
John C. Dewey.

THE NORRIS PETERS CO., PHOTO-LITHO., WASHINGTON, D. C.

UNITED STATES PATENT OFFICE.

GEORGE F. HUTCHINS, OF WORCESTER, MASSACHUSETTS, ASSIGNOR TO THE CROMPTON & KNOWLES LOOM WORKS, OF SAME PLACE.

SHEDDING MECHANISM FOR LOOMS.

SPECIFICATION forming part of Letters Patent No. 596,879, dated January 4, 1898.

Application filed April 26, 1897. Serial No. 633,979. (No model.)

*To all whom it may concern:*

Be it known that I, GEORGE F. HUTCHINS, a citizen of the United States, residing at Worcester, in the county of Worcester and State of Massachusetts, have invented certain new and useful Improvements in Shedding Mechanism for Looms, of which the following is a specification.

My invention relates to shedding mechanism for the harnesses of looms; and the object of my invention is to improve upon and simplify the construction of the shedding mechanism shown and described in my United States Patent No. 431,263, and more particularly to substitute for the two frames which support the two sets of two and three armed levers a single frame, preferably made in one piece, and to substitute for said levers segments of circles or sheaves having grooved edges to receive the connectors leading to the top of the harness-frames, and, further, I preferably make the transverse bars or sections of the frame which connect the side bars together in the shape of drip-pans to catch any drippings of oil with which the parts of the shedding mechanism may be lubricated.

My invention consists in certain novel features of construction of my shedding mechanism, as will be hereinafter fully described.

Figure 1:
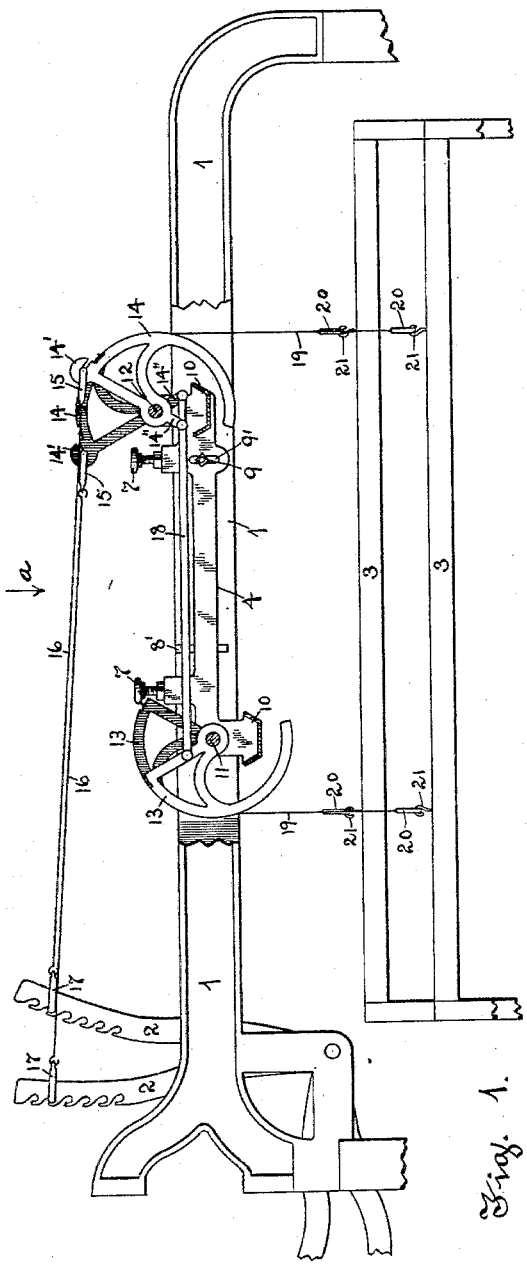
Figure 2:
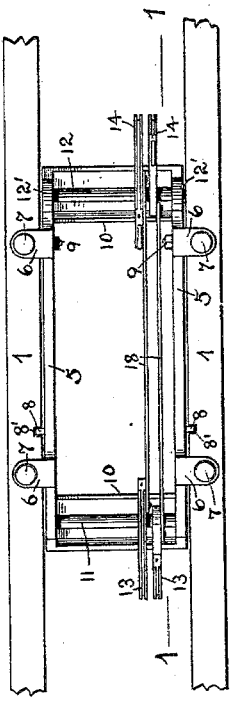
Figure 3:
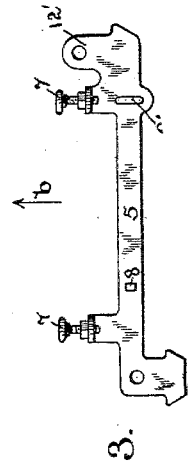

Referring to the drawings, Figure 1 shows the upper portion or arches of a loom-frame and a sectional view of my improvements applied thereto, taken on line 1 1, Fig. 2, looking in the direction of arrow *b*, same figure. Two harness levers or jacks and the upper part of two harness-frames are shown. Fig. 2 is a plan view of the central portion shown in Fig. 1, looking in the direction of arrow *a*, same figure. The connections to the harness-levers are not shown. Fig. 3 is a side view of the frame detached, looking in the direction of arrow *b*, Fig. 2. The sheaves and their connections are not shown.

In the accompanying drawings, 1 are the arches or upper portions of a loom-frame. 2 are the notched harness levers or jacks, preferably made curved at their upright notched edges, as shown, and pivotally supported on the arch-frame. 3 are the harness-frames—that is, the upper portion of said frames.

Between the loom-arches 1 is supported the adjustable and removable frame 4, which carries the two sets of sheaves. The frame 4 consists of the two parallel side bars 5 5, each having two outwardly-extending ears or flanges 6 6, which extend over the top of the arches 1, as shown in Fig. 2, and are provided with adjusting-screws 7 to level and adjust the frame 4. A lug or knob 8 extends out from each bar 5 and enters a vertical slot 8' in the inner side of the loom-arches to hold the frame in place, as shown in Fig. 2. A bolt 9 extends through a hole in the loom-arch and through a vertical slot 9' in each side bar 5 of the frame 4 to secure the frame to the loom-arches and prevent its being tilted at the end.

The side bars 5 of the frame are connected at each end by the transverse bars or plates 10 10, which are preferably made integral with the side bars 5, as shown in the drawings, and in the shape of and to form drip-pans. Extending over each drip-pan 10 and secured in the ends of the bars 5 of the frame 4 are two shafts 11 and 12. Upon said shafts are loosely mounted the segments of circles or sheaves 13 and 14. The shafts 11 and 12 preferably do not lie in the same horizontal plane, but the shaft 12 is preferably mounted in stands 12', which extend above the side bars of the frame, as shown in Fig. 1.

The sheaves 14 are formed with a hook 14' at the upper end thereof, over which extends a link 15, which is connected by a wire 16 with a link 17, extending over the upright arm of the harness-lever 2 and fitting into one of the notches therein. The sheaves 14 are also provided with a downwardly-extending arm 14" below its pivot-point, and to said arm is pivotally attached one end of a bar 18. The other end of the bar 18 is pivotally attached to the sheave 13 above its axis, as shown in Fig. 1. Said bar 18 preferably extends in a horizontal plane and parallel with the side bars 5 of the frame 4.

The outer edge of the sheaves 13 and 14 are grooved to receive the cord or connection 19, which is fastened at one end of the upper part of the sheave and at the other end to a link 20, connected by a screw 21 with the top bar of the harness-frame 3.

The operation of my shedding mechanism will be readily understood by those skilled in the art.

As the harness-levers 2 swing or move back and forth on their pivotal support the harness-frames, through connections 16, sheaves 14 and 13, connector-bar 18, and connections 20 to the harness-frames, are by the construction and arrangement of the sheaves and connections raised equally at each end.

The advantages of my shedding mechanism are that a single frame, preferably made in one piece, is used for supporting the two sets of sheaves, and that the sheaves are made as segments of circles having grooves in their peripheries to receive and hold in place the connections to the harness-frames, which connections are secured at one end directly to the sheaves.

The transverse connections between the side bars of the sheave-frame are preferably made in the form of drip-pans to economize space and do away with the necessity of any extra parts and prevent any dripping of the oil upon the warp, &c.

It will be understood that the details of construction of certain parts of my shedding mechanism may be varied, if desired.

Having thus described my invention, what I claim as new, and desire to secure by Letters Patent, is—

1. In the shedding mechanism of a loom, a frame adapted to be supported between the arches, carrying the shafts for the two sets of sheaves over which the connections pass to the harness-frames, and having transverse drip-pans extending between and secured to the side bars of the frame, below the shafts on which the sheaves are mounted, substantially as shown and described.

2. A sheave-supporting frame for the shedding mechanism of looms, adapted to be adjustably mounted between the two loom-arches, and comprising two side bars, connected at their ends by transverse bars or plates made integral therewith, and in the form of drip-pans, and means for adjusting said frame substantially as shown and described.

3. In the shedding mechanism of a loom, the combination with a frame, adapted to be supported between the loom-arches, and having two rods or shafts extending transversely between the ends of the frame, of two sets of sheave-segments mounted on said shafts, and a connector between the sheaves, secured at one end below the axis of one set of sheaves, and at its other end above the axis of the other set of sheaves, and connections from the sheaves to the harness-frames, and from one set of sheaves to the harness-jacks, substantially as shown and described.

4. In the shedding mechanism of looms, the combination with a frame supported between and connected to the loom-arches, consisting of two side bars and two transverse drip-pans extending between and secured to the side bars at the ends thereof, and two shafts supported in the frame above the drip-pans, one shaft being in a higher plane than the other shaft, of two sets of sheaves supported in said frame, and mounted on said shafts, a rod or bar connecting a sheave of one set with a sheave of the other set, and pivotally secured at one end to one sheave below its axis, and at its other end to the other sheave above its axis, and connections from said sheaves to the harness-frames, and from one of the sets of sheaves to the harness-levers, substantially as shown and described.

5. In the shedding mechanism of looms, the combination with a frame supported between the loom-arches, consisting of two side bars, one or both having an opening therein, to receive a bolt for securing said bars to the loom-arches, and two transverse drip-pans extending between and secured to the side bars at the ends thereof, and two shafts supported in the frame above the drip-pans, one shaft being in a higher plane than the other shaft, of two sets of sheaves supported in said frame and mounted on said shafts, a rod or bar connecting a sheave of one set with a sheave of the other set, and pivotally secured at one end to one sheave below its axis, and at its other end to the other sheave above its axis, and connections from said sheaves to the harness-frames, and from one of the sets of sheaves to the harness-levers, substantially as shown and described.

GEORGE F. HUTCHINS.

Witnesses:
J. C. DEWEY,
M. J. GALVIN.